(12) United States Patent
Dirksen et al.

(10) Patent No.: US 9,534,949 B2
(45) Date of Patent: Jan. 3, 2017

(54) PRE-COLLAPSED CAPACITIVE MICRO-MACHINED TRANSDUCER CELL WITH STRESS LAYER

(71) Applicant: KONINKLIJKE PHILIPS N.V., Eindhoven (NL)

(72) Inventors: Peter Dirksen, Valkenswaard (NL); Ronald Dekker, Valkenswaard (NL); Vincent Adrianus Henneken, Utrecht (NL); Adriaan Leeuwestein, Heeze (NL); Bout Marcelis, Eindhoven (NL); John Douglas Fraser, Woodinville, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 347 days.

(21) Appl. No.: 14/349,077

(22) PCT Filed: Oct. 26, 2012

(86) PCT No.: PCT/IB2012/055919
§ 371 (c)(1),
(2) Date: Apr. 2, 2014

(87) PCT Pub. No.: WO2013/061298
PCT Pub. Date: May 2, 2013

(65) Prior Publication Data
US 2014/0251014 A1    Sep. 11, 2014

Related U.S. Application Data

(60) Provisional application No. 61/552,482, filed on Oct. 28, 2011.

(51) Int. Cl.
*G01H 9/00* (2006.01)
*B06B 1/02* (2006.01)

(52) U.S. Cl.
CPC ............ *G01H 9/008* (2013.01); *B06B 1/0292* (2013.01); *Y10T 29/49005* (2015.01)

(58) Field of Classification Search
CPC .. B06B 1/0292; G01H 9/008; Y10T 29/49005
(Continued)

(56) References Cited

U.S. PATENT DOCUMENTS

| | | | | |
|---|---|---|---|---|
| 5,619,476 A | * | 4/1997 | Haller | ............ B06B 1/0292 367/153 |
| 6,004,832 A | * | 12/1999 | Haller | ............ B06B 1/0292 216/2 |

(Continued)

FOREIGN PATENT DOCUMENTS

| | | |
|---|---|---|
| EP | 1028466 A1 | 8/2000 |
| WO | 2009037655 A2 | 3/2009 |

(Continued)

OTHER PUBLICATIONS

Ergun et al "Capacitive Micromachined Ultrasonic Transducers: Fabrication Technology" IEEE Transactions on Ultrasonics, Ferroelectronics, and Frequency Control, vol. 52, No. 12, Dec. 2005.

(Continued)

*Primary Examiner* — J M Saint Surin (57) ABSTRACT

The present invention relates to a pre-collapsed capacitive micro-machined transducer cell (10) comprising a substrate (12), and a membrane (14) disposed above a total membrane area (Atotal), wherein a cavity (20) is formed between the membrane (14) and the substrate (12), the membrane comprising a hole (15) and an edge portion (14a) surrounding the hole (15). The cell (10) further comprises a stress layer (17) on the membrane (14), the stress layer (17) having a predetermined stress value with respect to the membrane (14), the stress layer (17) being adapted to provide a bending moment on the membrane (14) in a direction towards the substrate (12) such that the edge portion (14a) of the (Continued)

membrane (14) is collapsed to the substrate (12). The present invention further relates to a method of manufacturing such pre-collapsed capacitive micro-machined transducer cell (10).

14 Claims, 5 Drawing Sheets

(58) Field of Classification Search
USPC .............................................. 73/632; 29/594
See application file for complete search history.

(56) References Cited

U.S. PATENT DOCUMENTS

| | | | |
|---|---|---|---|
| 7,745,248 B2 | 6/2010 | Park et al. | |
| 8,402,831 B2 * | 3/2013 | Kupnik | B06B 1/0292 |
| | | | 310/300 |
| 9,117,438 B2 * | 8/2015 | Dirksen | B06B 1/0292 |
| 2003/0022412 A1 | 1/2003 | Cornett et al. | |
| 2006/0116585 A1 | 6/2006 | Felix et al. | |
| 2014/0265721 A1 * | 9/2014 | Robinson | B06B 1/0292 |
| | | | 310/300 |
| 2014/0307528 A1 * | 10/2014 | Dekker | B06B 1/0292 |
| | | | 367/178 |

FOREIGN PATENT DOCUMENTS

| | | | |
|---|---|---|---|
| WO | 2010032156 A2 | 3/2010 | |
| WO | 2010097729 A1 | 9/2010 | |
| WO | WO2013072803 | * 5/2013 | ............ B06B 1/02 |

OTHER PUBLICATIONS

Bayram et al "Capacitive Micromachined Ultrasonic Transducer Design for High Power Transmisison" IEEE Transactions on Ultrasonics,Ferroelectronics and Frequency Control, vol. 52, No. 2 Feb. 2005.

* cited by examiner

PRE-COLLAPSED CAPACITIVE MICRO-MACHINED TRANSDUCER CELL WITH STRESS LAYER

CROSS-REFERENCE TO PRIOR APPLICATIONS

This application is the U.S. National Phase application under 35 U.S.C. §371 of International Application No. PCT/IB2012/055919, filed on Oct. 26, 2012, which claims the benefit of U.S. Provisional Application No. 61/552,482, filed on Oct. 28, 2011. These applications are hereby incorporated by reference herein.

FIELD OF THE INVENTION

The present invention relates to a pre-collapsed capacitive micro-machine transducer cell, in particular a capacitive micro-machined ultrasound transducer (cMUT) cell or a capacitive micro-machined pressure sensor cell, and a method of manufacturing the same.

BACKGROUND OF THE INVENTION

Recently micro-machined ultrasound transducers (MUT) have been developed. Micro-machined ultrasound transducers have been fabricated in two design approaches, one using a semiconductor layer with piezoelectric properties (pMUT) and another using a membrane (or diaphragm) and substrate with electrodes (or electrode plates) forming a capacitor, so-called capacitive micro-machined ultrasound transducer (cMUT).

A cMUT cell comprises a cavity underneath the membrane. For receiving ultrasound waves, ultrasound waves cause the membrane to move or vibrate and the variation in the capacitance between the electrodes can be detected. Thereby the ultrasound waves are transformed into a corresponding electrical signal. Conversely, an electrical signal applied to the electrodes causes the membrane to move or vibrate and thereby transmitting ultrasound waves.

Initially, cMUT cells were produced to operate in what is known as an "uncollapsed" mode. The conventional "uncollapsed" cMUT cell is essentially a non-linear device, where the efficiency strongly depends on the bias voltage applied between the electrodes.

In order to solve this problem, so-called "pre-collapsed" cMUT cells have recently been developed. In a pre-collapsed cMUT cell a part of the membrane is permanently collapsed or fixed to the bottom of the cavity (or substrate). Above a certain bias voltage the efficiency of a pre-collapsed cMUT cell is substantially bias voltage-independent, which makes the cMUT cell much more linear.

In the pre-collapsed cMUT cell, the membrane can be collapsed using different methods, for example using electrical or mechanical collapsing.

Electrical collapsing can for example be achieved using the bias voltage. WO 2009037655 A2 discloses a method for producing a cMUT, comprising providing a nearly completed cMUT, wherein the nearly completed cMUT defines one or more cMUT elements that include: (i) a substrate layer, (ii) an electrode plate, (iii) a membrane layer, and (iv) an electrode ring, defining at least one hole through the membrane layer for each cMUT element, applying a bias voltage across membrane and substrate layers of the one or more cMUT elements so as to collapse the membrane layer relative to the substrate layer, and fixing and sealing the collapsed membrane layer relative to the substrate layer by applying an encasing layer.

Mechanical collapsing can for example be achieved using the ambient air pressure. WO 2010097729 A1 discloses a cMUT cell comprising a substrate, a first electrode attached to the substrate, a movable membrane formed in spaced relationship to the first electrode, a second electrode attached to the membrane, and a retention member, overlaying the movable membrane when the membrane is in a pre-collapsed state which acts to retain the membrane in its pre-collapsed state in the absence of the bias voltage. In one example, the retention member is cast over the cMUT transducer cell while the membrane is brought to a pre-collapsed state by application of (atmospheric) pressure to the membrane.

Pre-collapsed cMUT cells as disclosed in WO 2010097729 A1 have been successfully manufactured as low frequency cMUT cells having a relative large diameter membrane. The collapse pressure was low and the cMUT cells were pre-collapsed by ambient air pressure (i.e. the membrane touches the bottom of the cavity). However, for high frequency cMUT cells a retention member as disclosed in WO 2010097729 A1 cannot be applied, as the collapse pressure is very large and can easily exceed for example 5 Bar or even 10 Bar. In this case, the retention layer as disclosed in WO 2010097729 A1 is not strong enough to keep the membrane in place. Thus, the problem with the cMUT cells as disclosed in WO 2010097729 A1 is that it is essentially a "large membrane" solution, but does not work for high frequency cMUT cells, having a small membrane diameter.

There is a need to improve such pre-collapsed capacitive micro-machined transducer cell, in particular for high frequencies.

SUMMARY OF THE INVENTION

It is an object of the present invention to provide an improved pre-collapsed capacitive micro-machined transducer cell and method of manufacturing the same, in particular for a high-frequency pre-collapsed capacitive micro-machined transducer cell.

In a first aspect of the present invention a pre-collapsed capacitive micro-machined transducer cell is presented, which comprises a substrate, a membrane covering a total membrane area, wherein a cavity is formed between the membrane and the substrate, the membrane comprising a hole and an edge portion surrounding the hole. The cell further comprises at least part of a stress layer on the membrane, the stress layer having a predetermined stress value with respect to the membrane, the stress layer adapted to provide a bending moment on the membrane in a direction towards the substrate such that the edge portion of the membrane is collapsed to the substrate.

In another aspect of the present invention a pre-collapsed capacitive micro-machined transducer cell is presented, which comprises a substrate, a membrane, and a cavity formed between the membrane and the substrate, the membrane comprising a hole and an edge portion surrounding the hole, the edge portion of the membrane being collapsed to the substrate. The cell further comprises at least part of a stress layer formed on the membrane, the stress layer having a predetermined stress or stress value with respect to the membrane.

In a further aspect of the present invention a method of manufacturing a pre-collapsed capacitive micro-machined transducer cell is presented, the method comprising the steps of providing a substrate, providing a membrane covering a total membrane area, wherein a cavity is formed between the membrane and the substrate. The method further comprises the steps of providing a stress layer on the membrane, the stress layer having a predetermined stress value with respect to the membrane, providing a hole in the membrane such that the membrane comprises an edge portion surrounding the hole, the stress layer adapted to provide a bending moment on the membrane in a direction towards the substrate such that the edge portion of the membrane is collapsed to the substrate.

The basic idea of the invention is to provide an elegant solution for providing a pre-collapsed capacitive micromachined transducer cell, in particular a high-frequency pre-collapsed capacitive micro-machined transducer cell. A stress layer (or at least part thereof in the final cell) having a specific stress or stress value with respect to the membrane is present or formed on the membrane. The stress layer is adapted to or configured to provide a bending moment on the membrane (or a deflection of the membrane) in a direction towards the substrate such that the edge portion of the membrane is collapsed to the substrate. In other words, the bending moment is sufficiently large to collapse the edge portion to the substrate. The stress layer is used to bring the edge portion of the membrane to the substrate (or bottom of the cavity). In other words, the stress layer causes a bending moment that forces the membrane into collapse (in particular a bending moment large enough to bend the membrane to the substrate or bottom of the cavity). The stress layer therefore forces the membrane into collapse. In particular, the amplitude of the deflection, or the unconstrained deflection (i.e. in the absence of the substrate), should exceed the height of the cavity (or gap distance) so that the membrane is collapsed to the substrate. In particular if the stress layer is arranged on the side of the membrane facing away from the substrate, the stress value should be negative, thus compressive stress or compressive force. In this case the stress layer has a predetermined amount of compressive stress. Alternatively, if the stress layer is arranged on the side of the membrane facing the substrate, the stress value should be positive, thus tensile stress. In this case the stress layer has a predetermined amount of tensile stress.

An additional stress layer is applied or introduced in the cell (formed on the membrane) having a (deliberately created) certain stress value or level and preferably a certain position, to force the membrane into collapse. Also the position of the stress layer can help to provide a bending moment on the membrane in a direction towards the substrate (or to create a displacement of the membrane in direction towards the substrate). The stress value, and possibly also the position of the stress layer, can be selected such that the edge portion of the membrane is collapsed to the substrate when the hole is provided in the membrane. The stress layer can be temporarily present (e.g. only during manufacturing) or permanently present (e.g. in the final cell being manufactured)).

Preferred embodiments of the invention are defined in the dependent claims. It shall be understood that the claimed method of manufacturing has similar and/or identical preferred embodiments as the claimed cell and as defined in the dependent claims.

In one embodiment, the stress layer extends beyond the total membrane area. In this way the position of the stress layer provides a bending moment on the membrane in a direction towards the substrate. For example in case of a circular shaped cell and membrane, the total membrane area can be defined by the diameter of the membrane (or cavity). In such a case, an outer radius of the stress layer can be bigger than the radius of the total membrane area.

In another embodiment, the stress layer comprises a hole. In this way the hole in the membrane can easily be provided (in particular in the centre of the total membrane area). The hole in the stress layer can in particular be also in the centre of the total membrane area. Preferably the centre of the hole in the stress layer and the centre of the hole in the membrane are aligned.

In a variant of this embodiment, the hole of the stress layer is bigger than the hole of the membrane. In this way the position of the stress layer helps to provide a bending moment on the membrane in a direction towards the substrate, in particular when used in combination with the previous embodiment. Such hole of the stress layer has a beneficial effect on the deflection profile of the membrane. The size of the hole can be optimized so as to achieve the largest effect. For example in case of a circular shaped cell and membrane, an inner radius of the stress layer (or edge of the edge portion) can be bigger than the radius of the hole of the membrane.

In a further embodiment, the stress layer is made of a metal or metal alloy. These materials have shown to provide the desired stress values in an easy manner.

In a further embodiment, the stress layer is made of at least one material selected from the group comprising Tungsten (W), Titanium-Tungsten (TiW), Molybdenum (Mo) and Molybdenum-Chrome (MoCr). These materials have shown to provide the desired stress values in an advantageous manner as they provide a high melting point. From these metals (alloys) the stress value can be tuned to the needed value.

Still further, in an embodiment, the collapse pressure of the membrane is bigger than 1 Bar. In a variant of this embodiment the collapse pressure of the membrane is bigger than 5 Bar. In another variant of this embodiment the collapse pressure of the membrane is bigger than 10 Bar. A membrane having a collapse pressure bigger than 1 Bar (or 5 Bar or even 10 Bar) does not collapse by the ambient pressure, but the stress layer is needed to provide the collapse.

In another embodiment, a diameter of the membrane is below 150 μm, in particular below 100 μm. In this way a high-frequency pre-collapsed capacitive micro-machined transducer cell is provided. The center frequency can for example be above 8 MHz, in particular above 10 MHz.

In a further embodiment, the cell further comprises a plug arranged in the hole of the membrane, the plug being located only in a subarea of the total membrane area covered by the membrane.

In a further embodiment, the cell further comprises a cover layer arranged on the membrane and/or the plug. In this way a matching of the cell or membrane thickness to the specific resonance frequency of the cell (thus providing acoustic property control) or to the operating range can be achieved. Also the cover layer may provide chemical passivation.

In another embodiment, the cell further comprises a first electrode on or in the substrate and/or a second electrode on or in the membrane. In this way a capacitive cell can be provided in an easy manner.

In a further embodiment, the second electrode is a ring-shaped electrode. In another embodiment, the cavity is a ring-shaped cavity. In any of these embodiments the cell can be a circular shaped cell. A circular shape is an advantageous cell shape because it provides a fairly good filling of available space and/or very few higher order vibrational modes, in particular vibrational modes that compete with the desired mode for transmitted energy or create undesired signals that obscure the desired received signals.

In a further embodiment, the method further comprises removing the stress layer. In this way a cell is provided having improved thermal characteristics, in particular being less temperature dependent (e.g. if the stress layer is made of a metal). In particular, the entire stress layer can be removed, or a substantial part of the stress layer can be removed (e.g. leaving only some remainders of the stress layer).

In another embodiment, the stress value is provided when an additional layer is provided on the membrane. In this way the stress value can be provided in an easy manner.

In one embodiment, the cell is a capacitive micro-machined ultrasound transducer (cMUT) cell for transmitting and/or receiving ultrasound waves. In an alternative embodiment, the cell is a capacitive micro-machined pressure transducer (or sensor) cell for measuring pressure.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

It can be shown that the collapse pressure $P_c$ (i.e. the static air or water pressure by which the membrane just touches the substrate or bottom of the cavity) is equal to:

$$P_c = \frac{64 \cdot g \cdot D}{r^4},$$

with $$D = \frac{E \cdot t^3}{12(1 - v^2)},$$

wherein g is the height of the cavity (also called gap), r is the radius of the membrane, t is the membrane thickness, E is the Young's modulus and v is the Poison ratio.

As can be seen from the formula above, the collapse pressure scales as $P_c \sim 1/r^4$ with r being the radius of the membrane. A smaller diameter of the membrane implies a much higher collapse pressure. For many practical ultrasound devices, for example a 10 MHz ultrasound probe, the collapse pressure easily exceeds 5 Bar or even 10 Bar. This is in particular true for high-frequency cells, for example at centre frequencies of around 8 MHz and above. In such a case a retention member or layer, as for example disclosed in WO 2010097729, would be unable to maintain the collapsed mode.

Figure 1:
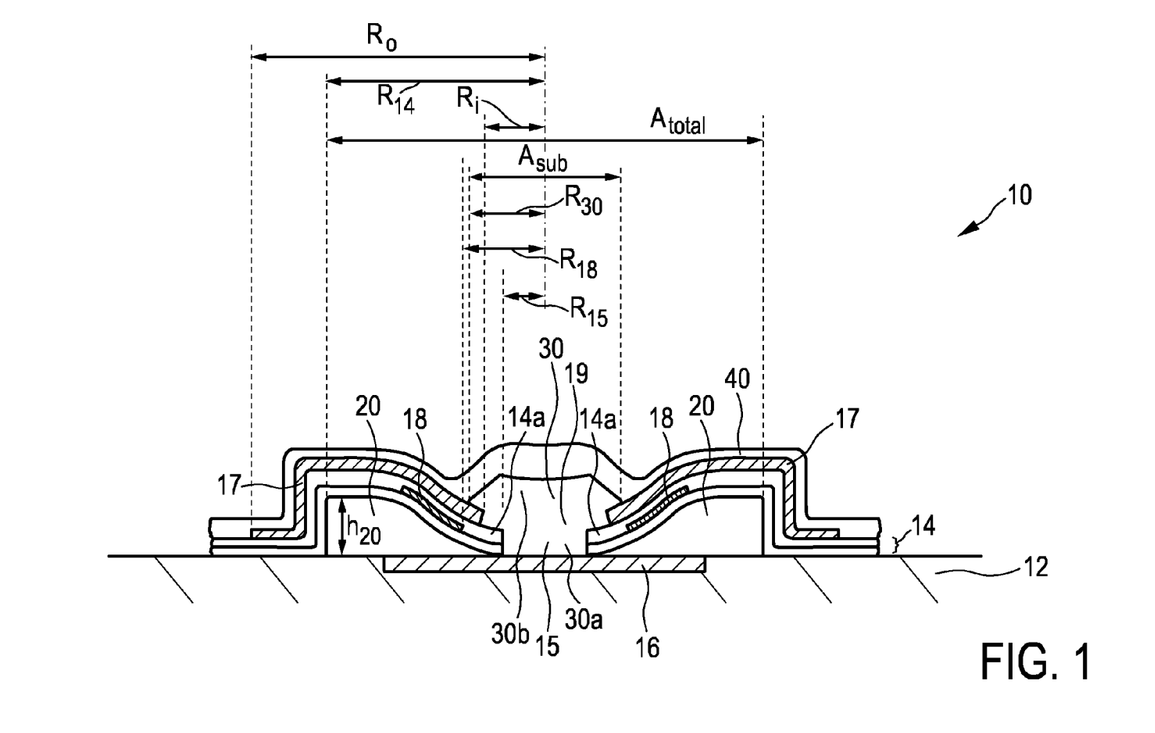
FIG. 1 shows a schematic cross-section of a pre-collapsed capacitive micro-machined transducer cell according to a first embodiment.
Figure 2:
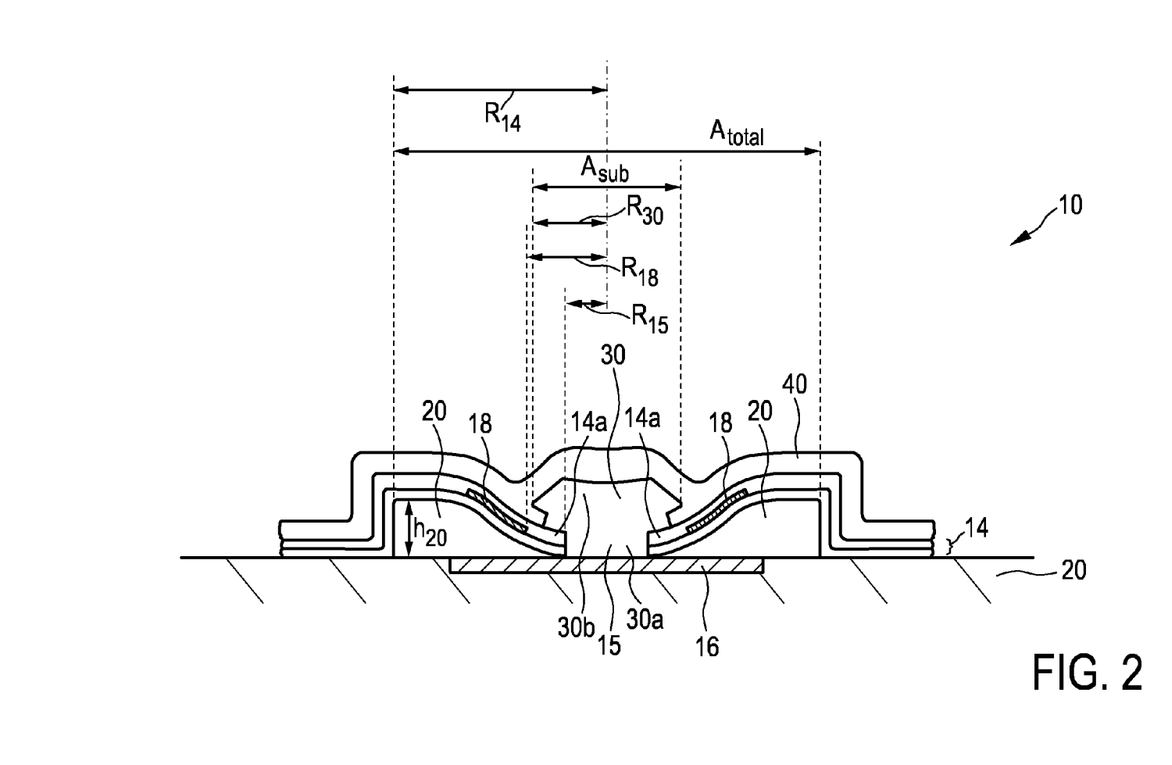
FIG. 2 shows a schematic cross-section of a pre-collapsed capacitive micro-machined transducer cell according to a second embodiment, FIGS. 3a to 3g each shows a different manufacturing step of a method of manufacturing a collapsed capacitive micro-machined transducer cell according to the first embodiment or the second embodiment, FIGS. 3f and 3g each shows a manufacturing step of a method of manufacturing a pre-collapsed capacitive micro-machined transducer cell according to the second embodiment.

FIG. 1 shows a schematic cross-section of a pre-collapsed capacitive micro-machined transducer cell 10 according to a first embodiment, and FIG. 2 shows a schematic cross-section of a pre-collapsed capacitive micro-machined transducer cell 10 according to a second embodiment. The cell 10 described herein can in particular be a high-frequency pre-collapsed capacitive micro-machined transducer cell, for example having a membrane diameter below 150 µm (in particular below 100 µm) and/or a center frequency of above 8 MHz, in particular above 10 MHz. Just as an example, a transducer cell having a frequency of about 10 MHz has a membrane diameter of about 60 µm. However, it will be understood that the cell described herein can also applied to lower frequencies.

The cell 10 of FIG. 1 or FIG. 2 comprises a substrate 12. The substrate 12 can for example be made of Silicon, but is not limited thereto. The substrate 12 can for example carry an ASIC that is electrically connected to the cell 10 and providing outside electrical connection.

The cell 10 further comprises a movable or flexible membrane 14 (or diaphragm) covering a total membrane area $A_{total}$ (in a plane in or parallel to the substrate). A cavity 20 is formed between the membrane 14 and the substrate 12. The membrane 14 comprises a hole 15 and an (inner) edge portion 14a surrounding the hole 15. The (inner) edge portion 15 forms a step or ledge or ridge. In other words, the upper surface of the edge portion 14a is higher than the upper surface of the membrane 14 (or its electrode). The hole 15 of the membrane 14 is located in the center or center area of the total membrane area $A_{total}$. The edge portion 14a is collapsed to the substrate 12, thus providing a pre-collapsed cell. In other words the edge portion 14a (or membrane 14) is in contact with the substrate 12 (or bottom of the cavity 20).

The cell 10 of the first embodiment shown in FIG. 1 or the second embodiment shown in FIG. 2 further comprises a first electrode 16 formed on or in the substrate 12 and a second electrode 18 formed in (or embedded in) the membrane 14. In other words, the substrate 12 comprises the first electrode therein or thereon, and the membrane 14 comprises the second electrode 18 therein. In particular, the first electrode 16 can be seen to be part of the substrate 12, and the second electrode 18 can be seen to be part of the membrane 14. In this way a capacitive cell is provided. The cell 10 can in particular be a capacitive micro-machined ultrasound transducer cell for transmitting and/or receiving ultrasound waves. For receiving ultrasound waves, ultrasound waves cause the membrane 14 (and its electrode 18) to move or vibrate and the variation in the capacitance between the first electrode 16 and the second electrode 18 can be detected. Thereby the ultrasound waves are transformed into a corresponding electrical signal. Conversely, an electrical signal applied to the electrodes 16, 18 causes the membrane 14 (and its electrode 18) to move or vibrate and thereby transmitting ultrasound waves. Alternatively, the cell can also be any other suitable capacitive micro-machined transducer cell, such as for example a capacitive micro-machined pressure transducer (or sensor) cell for measuring pressure.

In the embodiments described herein, the membrane 14 comprises multiple (e.g. two) layers, in particular electrically isolating layers or dielectric layers (e.g. ONO-layers), having the second electrode 18 embedded therein or therebetween. Just as an example, each ONO layer can have thickness of about 0.25 µm each, but is not limited thereto. Further, just as an example, the diameter of the membrane 14 can be between 25 and 150 µm, in particular between 50 and 150 µm or between 40 and 90 µm or between 60 and 90 µm. Also, just as an example, the height of the cavity (gap height) can be between 0.25 and 0.5 µm. However, it will be understood that any other suitable membrane (e.g. a single layer membrane) or dimensions can be used. Further, in the embodiments described herein, the second (top) electrode 18 is a ring-shaped electrode (or annular-shaped electrode), having a hole in its center or middle. However, it will be understood that any other suitable second electrode can be used.

Compared to the second embodiment of FIG. 2, the cell 10 of the first embodiment of FIG. 1 further comprises (permanently) a stress layer 17 formed on the membrane, the stress layer 17 having a predetermined stress or stress value (in particular being non-zero) with respect to the membrane 14. The stress layer is adapted to provide a bending moment (or force) on the membrane 14 (and thus a deflection of the membrane 14) in a direction towards the substrate 12 (downwards in FIG. 1) such that the edge portion 14a of the membrane 14 is collapsed to the substrate 12. The bending moment is sufficiently large to collapse the edge portion 14a to the substrate 12. In the first embodiment of FIG. 1 the stress layer 17 is permanently present, thus present in the final cell being manufactured. Thus, in this embodiment the stress layer 17 is also movable or flexible, in order to be able to move or vibrate together with the membrane 14.

In the first embodiment of FIG. 1, the position of the stress layer 17 also helps to provide the bending moment (or deflection) on the membrane in a direction towards the substrate 12. As can be seen in FIG. 1, the stress layer 17 extends beyond the total membrane area $A_{total}$. The stress layer 17 further comprises a hole 19. The hole 19 in the stress layer 17 is in the centre or centre area of the total membrane area $A_{total}$ and is aligned with the hole 15 in the membrane 14. However, the hole 19 of the stress layer 17 is bigger than the hole 15 of the membrane 14.

For the choice of the stress layer material, many materials can have built-in stress when deposited, for example due to chemical composition, thermal shrinkage between the deposition temperature and the ambient temperature, or a combination of both. When a material layer is deposited, the deposition conditions can determine the stress value. For example, the stress layer can be deposited by sputtering (e.g. for deposition of a metal stress layer). In such a case, for example the gas pressure during sputtering can determine the stress value.

The stress layer 17 can in particular be made of a metal or metal alloy, in particular of at least one material selected from the group comprising Tungsten (W), Titanium-Tungsten (TiW), Molybdenum (Mo) and Molybdenum-Chrome (MoCr). These materials have shown to provide the desired stress values in an advantageous manner as they provide a high melting point. From these metals (alloys) the stress value can be tuned to the needed value. In another example, the stress layer 17 can be a made of combination of compressive Nitride and an etch stop layer (preferably a metal). Alternatively, the stress layer 17 can also be made of a non-metal material. For example, the stress layer 17 can be made of Si3N4 (Silicon-Nitride), in particular deposited under "stress conditions".

For example, the stress layer 17 (e.g. made of Si3N4) can be deposited by plasma-enhanced chemical vapor deposition. As an example, if Silicon-Nitride is deposited in a plasma-enhanced chemical vapor deposition system, and if the operating parameters of the system (such as for example pressure(s), temperature(s), plasma power, RF settings, or gas flow rate(s) for both elements) are adjusted, the ratio of Si to N can be varied (e.g. varied from the exact 3:4 ratio). This can for example be used to induce built-in stress in the stress layer.

In the embodiment of FIG. 1 the stress layer 17 is arranged on the side of the membrane 14 facing away from the substrate (on top of the membrane in FIG. 1). Thus, in order to provide the collapsed state, the stress value should be negative, thus compressive stress. In other words the stress layer 17 of FIG. 1 has a predetermined amount of compressive stress. However, it will be understood that alternatively, the stress layer could also be arranged on the side of the membrane facing the substrate. Then, in order to provide the collapsed state, the stress value should be positive, thus tensile stress. In this case the stress layer has a predetermined amount of tensile stress.

The stress value also depends on the geometry, in particular the thickness t of the membrane, the diameter (or radius) of the membrane, and/or the height $h_{20}$ of the cavity 20 (or also called the gap value g), thus the amount of deflection needed. The stress value is in particular chosen such that the amplitude of the deflection exceeds the (maximum) height $h_{20}$ of the cavity 20 so that the membrane 14 is collapsed to the substrate 12. Just as an example, the stress value can be in the order of a few times −100 Mega Pascal (MPa). The metals cited above can for example be tuned up to −1000 MPa. In particular, the collapse pressure Pc (see formula above) of the membrane 14 (and its electrode 18) can be bigger than 1 Bar, or 5 Bar, or even 10 Bar.

The layers of the membrane 14 (including its electrode 18), the cover layer 40, and in the embodiment of FIG. 1 also the stress layer 17, move or vibrate. These layers determine the overall stiffness of the membrane or vibrating element. The overall stiffness, together with the membrane diameter and the gap height $h_{20}$, is an important factor for the properties of the transducer (for example resonance frequency and the electrical (collapse) voltage).

Compared to the first embodiment of FIG. 1, the cell of the second embodiment of FIG. 2 does not comprise a stress layer in the final cell 10 being manufactured. However, it will be understood that such stress layer can be temporarily present, thus only during manufacturing and not in the end product.

The second embodiment of FIG. 2 is a preferred embodiment. This will be explained in the following. When a metal is used as a stress layer 17, the stress value will also be temperature dependent due to a difference in thermal expansion coefficient. If the stress layer 17 would remain in the final cell 10 or end product, temperature dependent characteristics of the cell (in particular cMUT) would result, which may cause a thermal drift, for example of the collapse voltage. For this reason the stress layer 17 is removed in the preferred second embodiment of FIG. 2. If for acoustical reasons an additional metal layer is required (to improve the acoustical impedance of the membrane), it must be added as the last layer covering the entire membrane. Now the thermal drift is expected to be much less (in theory it would be exactly zero as there is no moment).

In another embodiment (not shown), only a part of (or remainders of) the stress layer 17 can be present in the final cell 10 or end product. In this case the stress layer 17 is removed to a fair amount during manufacturing, but remainders of the stress layer 17, in particular in the centre of the cell, are present (or at least likely to be visible).

The cell 10 of the first embodiment shown in FIG. 1 or the second embodiment shown in FIG. 2 further comprises a plug 30 arranged in the hole 15 of the membrane 14. The plug 30 is located only in a subarea $A_{sub}$ of the total membrane area $A_{total}$ covered by the membrane 14. The total membrane area $A_{total}$ is defined by the diameter $2*R_{14}$ of the membrane 14 (or cavity 20). The plug 30 contacts or is fixed to the substrate 12. The plug 30 is stationary (non-movable). The height and/or width of the plug 30 can determine the strength of the plug. Just as an example, a minimum height of the order of 1 μm could be required. The plug 30 can in particular be made of Nitride. In another example, the plug 30 is made of Silicon-Dioxide, or a combination of Nitride and Silicon-Dioxide. However, any other suitable material is possible.

In the first embodiment of FIG. 1 or the second embodiment of FIG. 2, the plug 30 has a "mushroom-like" shape. Thus, the plug 30 comprises a stem portion 30a arranged on (and in contact with or fixed to) the substrate 12 and a head portion 30b arranged on (and in contact with or fixed to) the edge portion 14a of the membrane. The subarea $A_{sub}$ (in which the plug 30 is located) is smaller than the area defined by the hole of the ring-shaped (or annular-shaped) second electrode 18. In other words, the plug 30 (in the subarea $A_{sub}$) is inside the hole of the electrode ring of the second electrode 18. This is because the plug 30 is stationary (non-movable) and the second electrode 18 should be located in the movable area of the membrane 14. If the second electrode 18 were located in a non-movable area (e.g. subarea $A_{sub}$ where the plug 30 is located) this would detract the transduction performance of the cell. Thus, in this way the second electrode 18 is located in the movable area of the membrane 14, and not in the non-movable area, so that a good transduction performance of the cell is maintained.

The plug 30 is located in or covers only a subarea of the total membrane area, and it is therefore not a retention layer being located in or covering all of the total membrane area (and possibly extending beyond the total membrane area). Contrary to the plug 30, such retention layer would be somewhat similar to a spring, because it would hold the membrane to the surface, but if you a strong enough force (e.g. pull) is applied on the membrane in an upwards direction (away from the substrate), the membrane would still move. This process would be reversible. One can imagine that for example at ambient pressure (1 Bar) such retention layer would be just strong enough to hold the membrane, but in vacuum the membrane could be released. Contrary thereto, the plug 30 really fixes (or nails) the membrane to the substrate surface. The only way to release the membrane would be to break the plug 30.

If in case of the second embodiment of FIG. 2, a stress layer 17 is temporarily present (only during manufacturing) as explained above, the plug 30 can comprise a recess formed by removing the stress layer 17. This recess is a characteristic pattern in the plug 30 (in particular made of Nitride) in the form of a kind of overhang structure, caused by the removal of the stress layer 17.

The cell 10 of the first embodiment shown in FIG. 1 or the second embodiment shown in FIG. 2 further comprises a cover layer 40 arranged on the membrane 14 (or stress layer 17) and on the plug 30. The cover layer 40 is also movable or flexible, in order to be able to move or vibrate together with the membrane 14. However, it will be understood that such cover layer is optional. In case of a cMUT cell, the cover layer 40 provides a matching of the cell 10, or more specifically the thickness of the cell or membrane, to the specific resonance frequency of the cell. In case of a pressure sensor cell, the cover layer 40 provides a matching to the operating range. Further optionally, additional layers or coatings can be applied, such as for example a coating of Parylene-C or of an acoustical lens material (e.g. Silicon).

Figure 4:
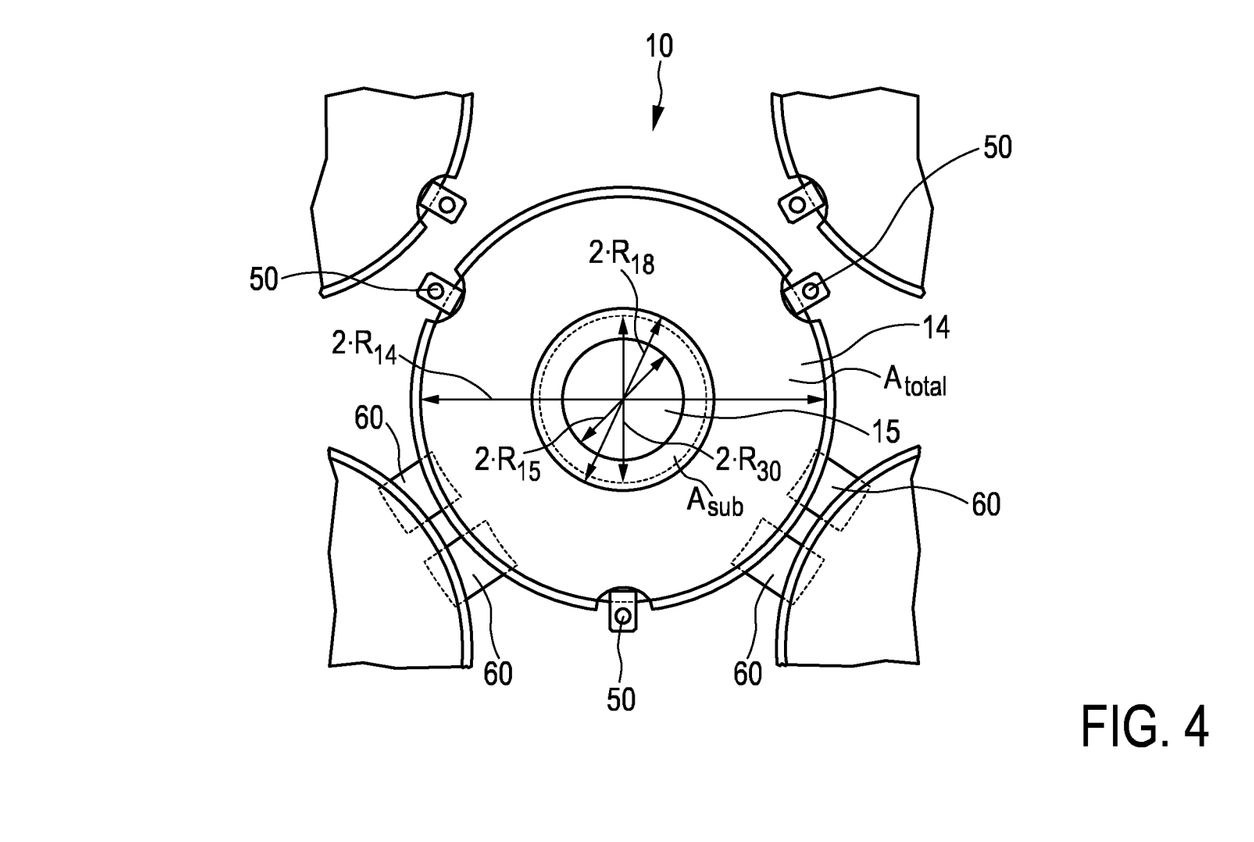
FIG. 4 shows a top view of a set of masks for a pre-collapsed capacitive micro-machined transducer cell according to an embodiment.

FIG. 4 shows a top view of a set of (etch) masks for a pre-collapsed capacitive micro-machined transducer cell 10 (or number of layers including the (etch) mask or reticle layout) according to an embodiment, in particular the first embodiment or the second embodiment explained above. As can be seen in FIG. 4, the cell 10 is a circular shaped cell. The membrane 14 is then a ring-shaped membrane. Therefore, the total membrane area $A_{total}$ is a circular shaped area and is defined (or limited) by the (outer) diameter $2*R_{14}$ of the membrane 14. The plug 30 (not shown in FIG. 4) of maximum diameter $2*R_{30}$ will be arranged in the hole 15 (having diameter $2*R_{15}$) of the membrane 14, the plug 30 being located only in a subarea $A_{sub}$ (indicated by dashed line in FIG. 4) of the total membrane area $A_{total}$. Optionally, as shown in FIG. 4, in addition to the central hole 15, several etch holes 50 (three etch holes 50 in FIG. 4) can be present at the rim of the membrane 14.

In FIG. 4, the hole of the ring-shaped second electrode 18 has a diameter of $2*R_{18}$, or also called inner diameter of the second electrode 18. In the example shown in FIG. 4, the outer diameter of the second electrode 18 extends beyond the total membrane area $A_{total}$. In other words, in this example the outer diameter of the second electrode 18 is bigger than the outer diameter of the membrane 14. However, it will be understood that the outer diameter of the second electrode 18 can be smaller than the outer diameter of the membrane 14 (or be within the total membrane area $A_{total}$), as for example illustrated in the embodiments of FIG. 1 or FIG. 2.

In FIG. 4 a number of (four) additional cells are indicated around the middle cell 10. The cells can form an array of cells or transducer elements. The middle cell 10 (or its electrode) is electrically connected to the other cells by electrical connections 60.

In case of a circular shaped cell, now referring back to FIG. 1 or FIG. 2, the second electrode 18 is a ring-shaped electrode. The cavity 20 is then a ring-shaped cavity. In case of such circular shaped cell, also the stress layer 17 is then a ring-shaped layer. In this case, as can be seen in FIG. 1, an outer radius $R_o$ of the stress layer 17 can be bigger than the radius $R_{14}$ of the membrane 14 or total membrane area $A_{total}$. Thus, as described before, the stress layer 17 can extend beyond the total membrane area $A_{total}$. Alternatively, in theory, the outer radius $R_o$ of the stress layer 17 could also be smaller than the radius $R_{14}$, as long as the necessary bending moment is provided. Further in this case, as can be seen in FIG. 1, an inner radius $R_i$ of the stress layer 17 can be bigger than the radius $R_{15}$ of the hole 15 of the membrane 14. Thus, as described before, the hole 19 (having diameter $2*R_i$) of the stress layer 17 can be bigger than the hole 15 (having diameter $2*R_{15}$) of the membrane 14.

In case of such circular shaped cell, the plug 30 is then a circular shaped plug 30. The plug 30 is smaller than the hole (having diameter $2*R_{18}$) in the ring-shaped second electrode 18. In other words, as can be seen in FIG. 1 or FIG. 2, the radius $R_{30}$ of the circular shaped plug 30 is smaller than the radius $R_{18}$ of the hole in the ring-shaped second electrode 18 (or inner radius $R_{18}$ of the second electrode 18). Thus, as described before, the subarea $A_{sub}$ (in which the plug 30 is located) is smaller than the area defined by the hole of the ring-shaped second electrode 18. The shape of the cell being a circular shaped cell is advantageous. However, it will be understood that any other suitable cell shape is possible.

FIGS. 3a to 3i each shows a different manufacturing step of a method of manufacturing a collapsed capacitive micro-machined transducer cell 10 according to the first embodiment or the second embodiment. The explanations made in connection with FIG. 1, FIG. 2 and FIG. 4 also apply for the method shown in FIG. 3, and vice versa.

Figure 3A:
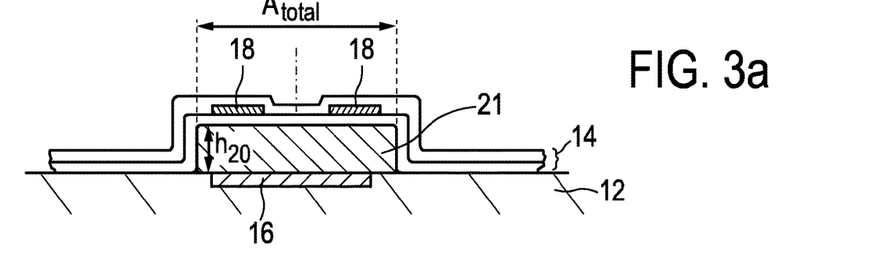

In an initial step shown in FIG. 3a, first a substrate 12 is provided, wherein a first electrode 16 is present in or on the substrate. Then, a membrane 14 (covering total membrane area $A_{total}$) is provided on the substrate 12. As described above, the membrane 14 comprises two layers (e.g. ONO-layers or ON-layers or O-layers or N-layers or a combination thereof) having the second electrode 18 embedded therein or there between. As can be seen in FIG. 3a, in this example, a sacrificial layer 21 of a thickness $h_{20}$ is provided on the substrate 12. The sacrificial layer 21 will be used to form the cavity 20 when the sacrificial layer 21 is removed (e.g. dry or wet etched). The membrane 14 is provided on the sacrificial layer 21. However, it will be understood that any other suitable way of providing the cavity 20 can be used.

Figure 3B:
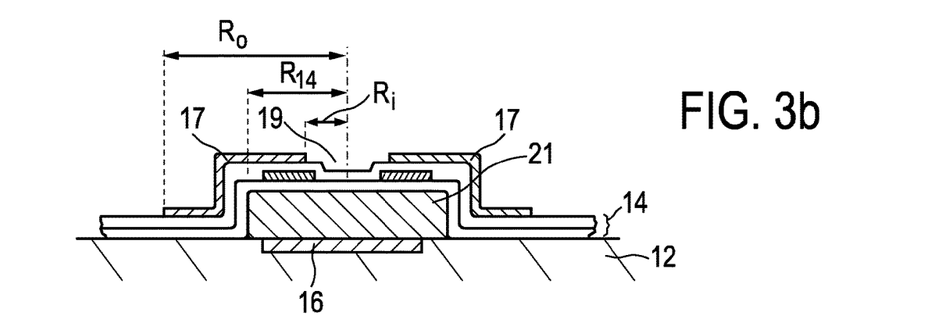

In a further step, as shown in FIG. 3b, a stress layer 17 is provided or formed (e.g. applied or deposited) on the membrane 14, the stress layer 17 having a predetermined stress value with respect to the membrane 14, as explained above in connection with the first embodiment. The stress layer 17 shown in FIG. 3b has a well defined inner radius $R_i$ and outer radius $R_o$. Preferably the outer diameter $2*R_o$ of the stress layer 17 exceeds the diameter $2*R_{14}$ of the membrane 14. Alternatively, in theory, the outer diameter $2*R_o$ of the stress layer 17 could also be smaller than the diameter $2*R_{14}$. The goal is to induce a bending moment, large enough to bend the membrane 14 to the substrate 12 or bottom of the cavity 20 once the membrane 14 is released.

Figure 3C:
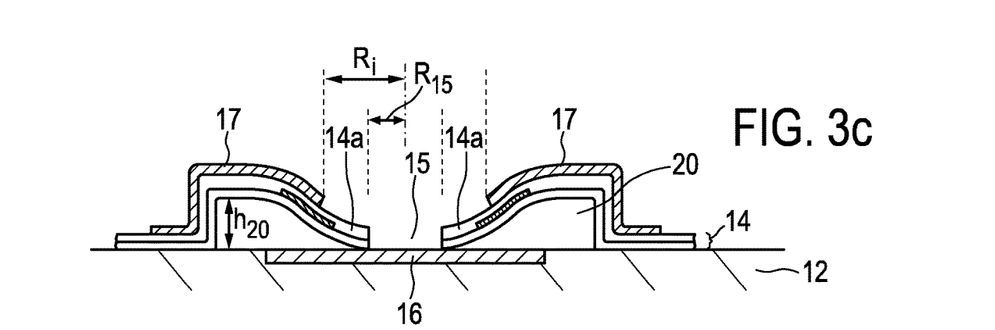

Then, referring to FIG. 3c, the membrane 14 is released by providing (e.g. etching) a hole 15 in the membrane 14 In case of this example using the sacrificial layer 21, the membrane 14 is released by providing the hole 15 and by performing a sacrificial etch of the sacrificial layer 21. After providing the hole 15, the membrane 14 then comprises an edge portion 14a surrounding the hole 15. The edge portion 14a of the membrane 14 then collapses to the substrate 12 (or bottom of the cavity 20). More specifically, the edge portion 14a of the membrane 14 collapses to the substrate 12 when or after the hole 15 in the membrane 14 is provided. This is due to the fact that the stress layer 17 provides a bending moment on the membrane 14 in direction towards the substrate 12, as explained above. The membrane 14 is now in contact with the substrate 12 (or bottom of the cavity 20).

In this example, the cavity 20 having a height $h_{20}$ is formed between the membrane 14 and the substrate 12 by removing (e.g. etching) the sacrificial layer 21. Here this is done in the step when the hole 14 in the membrane 14 is provided or subsequent to the step when the hole 14 is provided. In particular, in a first etching step the hole 15 in the membrane 14 can be provided, and in a subsequent etching step the sacrificial layer 21 can be removed. The hole 15 thus also functions as an etch hole. Optionally, additional etch holes can be present at the rim of the membrane, such as for example etch holes 50 in FIG. 4.

Figure 3D:
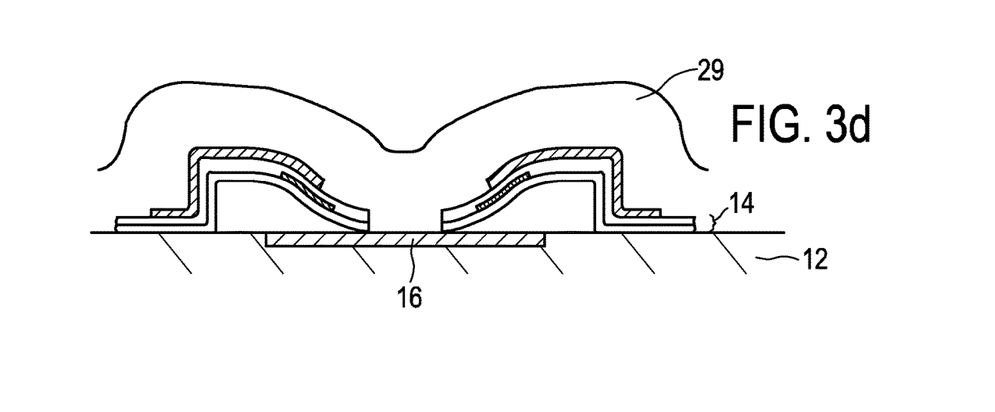
Figure 3E:
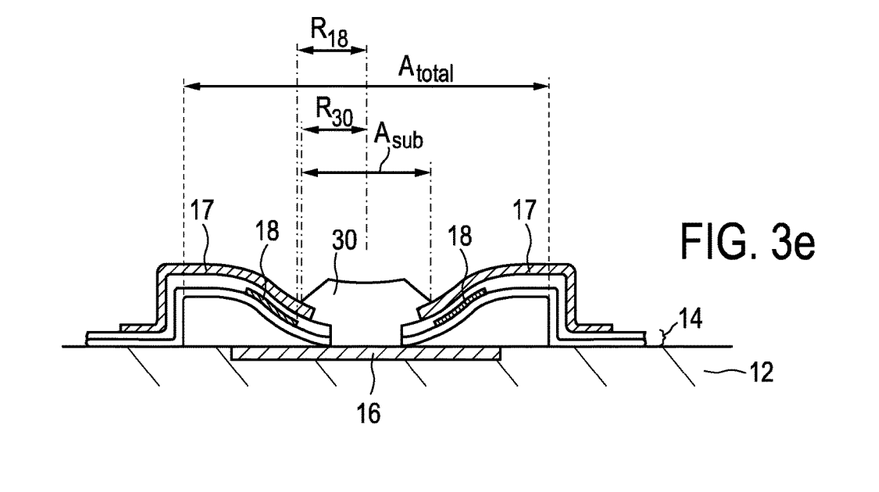

The steps shown in FIG. 3d and FIG. 3e are used to provide a plug 30 arranged in the hole 15 of the membrane 14, as explained above. The plug 30 is located only in a subarea $A_{sub}$ of the total membrane area $A_{total}$. First, referring to FIG. 3d, an additional layer 29 (e.g. made of Nitride) is provided on the membrane 14 in at least the total membrane area $A_{total}$ (in all of the total membrane area $A_{total}$). In FIG. 3d the additional layer 29 extends beyond the total membrane area $A_{total}$. The additional layer 29 seals the cavity 20 from its surrounding and permanently fixes the membrane 14 to the substrate 12 (or bottom of the cavity 20). Also the etching holes 50 can be closed by the additional layer 29. Now cell is a safe from external contamination.

For providing the plug, referring to FIG. 3e, the additional layer 29 is removed except for the layer portion located in the subarea $A_{sub}$. In this way the plug 30 (e.g. made of Nitride) is provided. Thus, the additional layer 29 is patterned and is then only present in the subarea $A_{sub}$, which is at the centre of the membrane 14. In particular, the height of the plug 30 can be the height of the additional layer 29 (e.g. made of Nitride). The membrane 14 is now permanently fixed to the substrate 12 (or bottom of the cavity 20) by the plug 30.

Just as a specific example, if the additional layer 29 (or plug layer) is made of Nitride, the deposition of the additional layer 29 is at typical 300° C. to 400° C. Thus the stress is the stress value at that temperature (and not at room temperature). In such specific example, Tungsten as stress layer material is then a good choice.

Figure 3F:
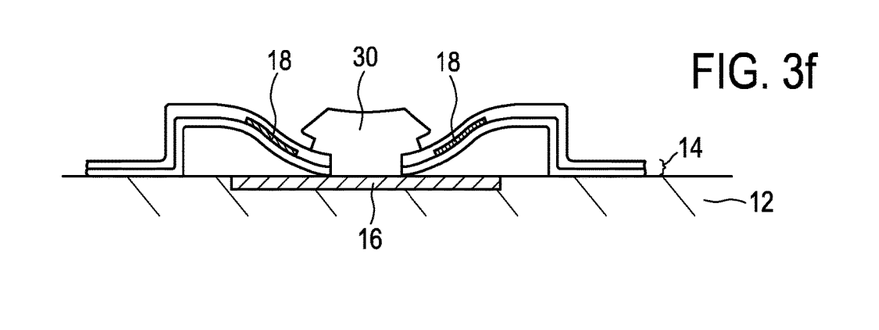
Figure 3G:
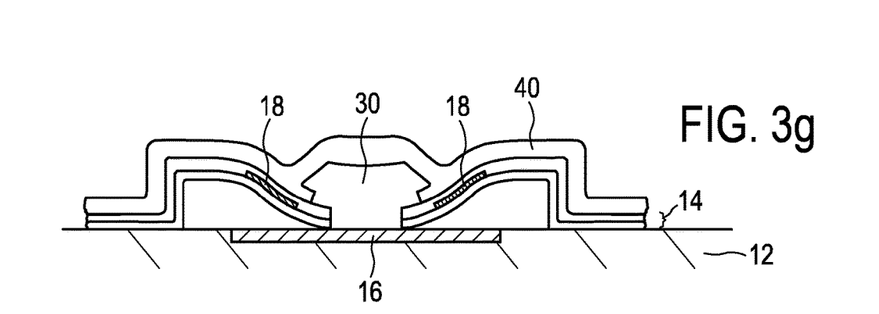

Up to this point, the manufacturing of the cell according to the first embodiment shown in FIG. 1 and the second embodiment shown in FIG. 2 have been identical. Now the further manufacturing steps of the second embodiment of FIG. 2 will be described. FIGS. 3f and 3g each shows a manufacturing step of a method of manufacturing the pre-collapsed capacitive micro-machined transducer cell according to the second embodiment. The method comprises the step of removing the stress layer 17, as shown in FIG. 3f. This can for example be performed by a selective etch with respect to the membrane 14 (e.g. ONO layers). The membrane 14 is unable to flip back as it is permanently fixed to the substrate 12 or bottom of the cavity 20 by the plug 30 (e.g. made of Nitride). In FIG. 3f the entire stress layer 17 is removed. However, it will be understood that also only a substantial part of the stress layer can be removed (e.g. leaving only some remainders of the stress layer). Just as an example, a wet etch process (isotropic) can remove all of the stress layer (e.g. made of metal). As another example, a dry etch process (directional or anistropic) can remove only a substantial part of the stress layer and leave remainders (in particular remainders in the recess of the plug 30).

Optionally, referring to FIG. 3g, a cover layer 40 can be provided or arranged on the membrane 14 and the plug 30 (e.g. using an N-deposition). Such cover layer 40 provides a matching of the cell 10, or more specifically the thickness of the cell or membrane, to the specific resonance frequency of the cell.

Further optionally, a number of additional processing steps can be performed. Just as an example, electrical connections of the cell 10 to a power supply (e.g. for electrical supply of Bias and RF) or electrical connection between different cells of an array of cells can be provided. Just as an example, some layers (e.g. Nitride layer) can be removed from the bondpads to make a conducting path to the electrodes. In addition, as another example, a protective layer or coating for electrical isolation (for example parylene-C) can be applied.

From a technology point of view, the pre-collapsed capacitive micro-machined transducer cell (in particular cMUT) of the present invention can in principle be manufactured in the same or a similar way as a conventional "uncollapsed" capacitive micro-machined transducer cell (in particular cMUT), which is for example described in detail in WO 2010032156, which is incorporated by reference herein. This has for example the advantage of CMOS compatibility, so that the cMUT can be combined with an ASIC, in particular a so-called micro beam former.

The present invention can be further described based on the following embodiments:

In one embodiment, the cell or cMUT cell comprises a membrane with embedded ring-shaped electrodes. The stack involves Aluminium for the electrodes, ONO and Nitride for the membrane, as for example described in detail in WO 2010032156.

In another embodiment, the deposition of a temporary patterned stress layer is followed by the sacrificial etch. When the membrane is released, the stress layer causes a bending moment that forces the membranes into collapse.

In another embodiment, a nitride layer is used to fixate the membrane to the bottom of the cavity permanently: the cell or cMUT cell is now pre-collapsed. This nitride layer is patterned and a significant fraction is removed leaving only a central plug or rivet of Nitride.

In a further embodiment, the temporary patterned stress layer is removed completely (preferred embodiment).

In another embodiment, the pre-collapsed cell or cMUT cell is finished by a final Nitride layer. Now the membrane thickness matches the desired characteristics such as the resonance frequency.

The present invention is applicable in any cMUT application, especially those involving ultrasound, but in principle also to any other pre-collapsed capacitive micro-machined transducer, such as for example a pressure sensor or pressure transducer. In case of an application to the pressure sensor, the linearity is improved at the cost of sensitivity.

A capacitive micro-machined pressure sensor or transducer measures the capacitance value between the electrodes. For two flat electrodes, separated by a distance d and having an area A, the capacitance value C is $C=\in*A/d \sim 1/d$. For simplicity the presence of a dielectric isolation layer between the electrodes is omitted in this formula.

In one example, electronically, the pressure sensor could be part of an electronic oscillator circuit, the oscillator frequency f being $f=1/(R*C) \sim d$, with R being the resistance of some external resistor. In this case, the pressure sensor output is the frequency of the electronic circuit and is linear distance in the distance d. It should be noted that this frequency has nothing to do with the mechanical resonance frequency of the membrane. Thus as the pressure is increased, the two plates move towards each other, the capacitance value increases and the frequency goes down. A pressure P causes the membrane to move downwards by an amount of h which can be written as $h=P*r^4/(64\,D)$, with r being the radius of the membrane, and D being a constant. Now, the distance d between the electrodes is $d=g-h$, as the gap g has decreased by an amount h, or $f \sim (g-h)/R$. Therefore, the pressure is approximately linear with the frequency until collapse of the membrane. However, in reality, the shape of the electrodes or membrane is not flat. The membrane bends, giving a variation in distances over the electrode. The best linearity is therefore obtained, if the electrodes are small, at the cost of having to measure a small capacitance value. In practice, an electrode having a 50% radius compared to the membrane radius is already pretty linear.

Here one example of measuring the electrical capacitance value has been described. However, it will be understood that the electrical capacitance value can also be measured in any other suitable way.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A pre-collapsed capacitive micro-machined transducer cell comprising:
   a substrate,
   a membrane, wherein a cavity is formed between the membrane and the substrate, the membrane comprising a hole and an edge portion surrounding the hole,
   at least part of a stress layer on the membrane, the stress layer having a predetermined stress value with respect to the membrane, the stress layer being configured to provide a bending moment on the membrane in a direction towards the substrate such that the edge portion of the membrane is collapsed to the substrate;
   wherein the stress layer comprises a hole.

2. The cell of claim 1, wherein the membrane covers a total membrane area and wherein the stress layer extends beyond the total membrane area.

3. The cell of claim 1, wherein the hole of the stress layer is bigger than the hole of the membrane.

4. The cell of claim 1, wherein the stress layer is made of a metal or metal alloy.

5. The cell of claim 1, further comprising a cover layer arranged on the membrane and/or the plug.

6. The cell of claim 1, wherein the cell is a capacitive micro-machined ultrasound transducer (cMUT) cell for transmitting and/or receiving ultrasound waves.

7. A pre-collapsed capacitive micro-machined transducer cell comprising:
   a substrate,
   a membrane, wherein a cavity is formed between the membrane and the substrate, the membrane comprising a hole and an edge portion surrounding the hole,
   at least part of a stress layer on the membrane, the stress layer having a predetermined stress value with respect to the membrane, the stress layer being configured to provide a bending moment on the membrane in a direction towards the substrate such that the edge portion of the membrane is collapsed to the substrate;
   wherein the stress layer comprises a hole, wherein the stress layer is made of at least one material selected from the group comprising Tungsten (W), Titanium-Tungsten (TiW), Molybdenum (Mo) and Molybdenum-Chrome (MoCr).

8. The cell of claim 1, wherein the collapse pressure ($P_c$) of the membrane is bigger than 1 Bar, in particular bigger than 5 Bar or 10 Bar.

9. The cell of claim 1, wherein a diameter of the membrane is below 150 μm.

10. A pre-collapsed capacitive micro-machined transducer cell comprising:
   a substrate,
   a membrane wherein a cavity is formed between the membrane and the substrate, the membrane comprising a hole and an edge portion surrounding the hole,
   at least part of a stress layer on the membrane, the stress layer having a predetermined stress value with respect to the membrane, the stress layer being configured to provide a bending moment on the membrane in a direction towards the substrate such that the edge portion of the membrane is collapsed to the substrate; wherein the stress layer comprises a hole, and
   a plug arranged in the hole of the membrane, the plug being located only in a subarea of a total membrane area covered by the membrane.

11. The cell of claim 10, further comprising a first electrode on or in the substrate and/or a second electrode on or in the membrane.

12. A method of manufacturing a pre-collapsed capacitive micro-machined transducer cell, the method comprising the steps of:
   providing a substrate,
   providing a membrane covering a total membrane area, wherein a cavity is formed between the membrane and the substrate,
   providing a stress layer on the membrane, the stress layer having a predetermined stress value with respect to the membrane and comprising a hole,
   providing a hole in the membrane such that the membrane comprises an edge portion surrounding the hole,
   the stress layer being configured to provide a bending moment on the membrane in a direction towards the substrate such that the edge portion of the membrane is collapsed to the substrate.

13. The method of claim 12, wherein the edge portion of the membrane collapses to the substrate when the hole in the membrane is provided.

14. The method of claim 12, further comprising removing the stress layer.

* * * * *